United States Patent [19]

McLelland

[11] Patent Number: 5,778,918
[45] Date of Patent: Jul. 14, 1998

[54] PILOT VALVE WITH IMPROVED CAGE

[75] Inventor: Mark W. McLelland, Angleton, Tex.

[73] Assignee: Varco Shaffer, Inc., Houston, Tex.

[21] Appl. No.: 733,414

[22] Filed: Oct. 18, 1996

[51] Int. Cl.$^6$ .............. F16K 43/00; F16K 31/124; F15B 13/042

[52] U.S. Cl. .............. 137/15; 137/315; 137/625.68; 251/63.6; 251/325; 277/59; 277/69

[58] Field of Search ............... 137/625.66, 625.68, 137/315, 15; 251/63.5, 63.6, 324, 325; 277/59, 69

[56] References Cited

U.S. PATENT DOCUMENTS

| | | | |
|---|---|---|---|
| 2,645,450 | 7/1953 | Chessman | 251/325 |
| 3,095,176 | 6/1963 | Hunt | 251/325 |
| 3,199,540 | 8/1965 | Forster | 251/324 |
| 3,580,286 | 5/1971 | Bash | 137/625.68 |
| 3,709,507 | 1/1973 | Underwood | 251/324 |
| 3,921,660 | 11/1975 | Kowalski | 137/625.66 |
| 4,011,892 | 3/1977 | Kowalski | 251/63.5 |
| 4,167,262 | 9/1979 | Lemmon | 251/325 |
| 4,491,155 | 1/1985 | Meyer et al. | 137/625.66 |
| 4,887,643 | 12/1989 | Tomlin et al. | 137/625.66 |

OTHER PUBLICATIONS

Baker Model B.T.E. Series 92 Flow Control Top–Entry Choke/Throttling Valve –2 pages.
McElroy–Willis Model MC–20 –C20 Parts List/Physical Dimensions –5 pages.
Hydril Specification Sheet –Bulletin: 23Q–O1, Issue Date: 1 Apr. 1986 –The 2"–3600# CMI Choke/Control Valve.
2 Inch CRB and 2 Inch CFB.

Primary Examiner—George L. Walton
Attorney, Agent, or Firm—Browning Bushman

[57] ABSTRACT

A two-position pilot-operated SPM valve includes an improved cage for controlling fluid flow to a ram of a subsea blowout preventer. SPM valve 10 includes a piston 48 axially movable with respect to a valve body 12, a spool 38 for moving within the valve body between an open position and a closed position, and a piston rod 34 structurally interconnecting the spool and the piston. A cage 40 within the valve body receives the spool 38, and includes an axially intermediate body 84 formed from a selected plastic material, an upper body 86 removably secured to the intermediate body and having one or more radial throughports 106 therein, and a lower body 88 removably secured to the intermediate body. An external seal 92 is provided for sealing between the intermediate body and the valve body, an internal seal 96 provides dynamic sealing engagement between the intermediate body and the exterior cylindrical surface 72 of the spool. Interior cylindrical surface 100 of the intermediate body is in sliding engagement with the exterior spool cylindrical surface 72, and substantially reduces wear on the spool due to the plastic-to-metal sliding engagement of these surfaces. During servicing of the SPM valve, an intermediate body 84 may be replaced with a new intermediate body and both the upper and lower cage bodies installed on the new intermediate body. An improved technique is also provided for compressing the coil spring which biases the spool to the closed position.

20 Claims, 3 Drawing Sheets

PILOT VALVE WITH IMPROVED CAGE

FIELD OF THE INVENTION

The present invention relates to a two-position pilot-operated valve of the type commonly used in hydrocarbon recovery operations for selectively controlling the flow of pressurized fluid to a blowout preventer ram. More particularly, this invention relates to a pilot-operated subsea valve for positioning on a control pod. The valve includes an improved cage for reliable sealing engagement with an axially movable spool to control operation of the subsea blowout preventer.

BACKGROUND OF THE INVENTION

Two-position pilot-operated valves have long been used in hydrocarbon recovery operations for controlling the flow of pressurized fluid to the ram of a blowout preventer. A plurality of such valves are normally included as part of a subsea control pod, and these valves have commonly been referred to as sub plate mounted or SPM valves. Although mounting of the valves on the control pod has changed over time depending on the application, the valves continue to be referred to as SPM valves. A subsea BOP control system for controlling fluid flow to the blowout preventer rams may thus include numerous SPM valves mounted on a subsea control pod provided above a BOP stack with auxiliary hydraulic accumulators. A hydraulic control manifold and accumulator unit is typically provided at the surface for transmitting fluid pressure to the SPM valves through a subsea hose bundle and then to the BOP stack.

Various types of SPM valves have been proposed. The most commonly used SPM valve includes a generally cylindrical valve body defining a central valve axis. The valve body includes a supply port and an outlet port, and in some applications also includes a vent port. A spool is axially movable relative to the valve body to control fluid flow between the supply port and the outlet port. A cage is provided within the valve body and is in static sealing engagement with the valve body and in dynamic sealing engagement with the spool. When the spool is in the closed position, the cage and spool block communication between the supply port and the outlet port, so that the outlet port and vent port (if provided) are in fluid communication. When the spool is moved to the valve open position, the supply port is in communication with the outlet port, and the vent port is blocked. Those skilled in the art will appreciate that an SPM valve may be provided for controlling fluid pressure to each side of a BOP ram, and that an SPM valve may be periodically cycled to close the BOP ram either for testing purposes or for shutting in a well.

The SPM valve is controlled by regulating pilot pressure to a piston, which moves axially to move the spool relative to the cage. The spool is biased in the closed position by one or more coil springs, which normally maintain the spool in sealing engagement with an upper seal plate. When pilot pressure is supplied to the SPM valve, the piston is forced downward toward the outlet port, thereby compressing the one or more coil springs and moving the spool downward toward the outlet port to sealing engage a lower seal plate. In its downward or open position, the spool allows fluid communication between the supply port and the outlet port and blocks the vent port. This type of SPM valve has several significant advantages over other types of valves which may be used to control fluid flow to a BOP ram, including poppet-type control valves.

While the above-described SPM valve has high reliability, several problems have limited its acceptance in the petroleum recovery industry. First, high wear is typically encountered between the cage and the spool which moves axially within the cage during cycling of the valve. Sealing integrity between the cage and the spool must be maintained, and wear on the exterior cylindrical surface of the spool and on the interior cylindrical surface of the cage decreases the useful life of the SPM valve. In many applications, the vent port of the valve is opened to the subsea environment, and accordingly the seal between the cage and the spool is subject to sea water, which is highly corrosive. Accordingly, SPM valves must periodically be returned to the surface for inspection and repair. In many instances, the spool needs to be replaced since its exterior surface is worn, and the cage must be replaced since its interior cylindrical surface also is worn.

Those skilled in the art have long recognized the problem of wear and galling between the cylindrical surfaces of a cage and spool of an SPM valve. Others have proposed reducing this wear by providing a plurality of plastic wear bands or wear rings in a groove axially spaced from the seal between the cage and the spool. This proposal has not proven to be satisfactory, in part because of the time and expense required to position the wear bands, and in part because play between the wear bands and the groove results in rapid wear of the bands. Accordingly, increased efforts have been expanded to manufacture the cage and the spool from more wear resistant materials, including particular types of stainless steel materials. These changes have not significantly reduced the frequency or the expense associated with servicing an SPM valve.

Another problem with prior art SPM valves relates to the difficulty involved in replacing the spool and/or the cage during a valve service operation. The stem or piston rod which interconnects the piston with the spool may include a nut at its lower end for fastening the spool to the piston rod. The threaded nut is fixedly secured to the piston rod and may be locked in place either by a tack weld or by using a lock-tight product. In many applications, the lock-tight product takes a good deal of time to harden, and accordingly delays are experienced in servicing SPM valves. Once the nut is secured in place to the piston rod, the upper seal plate, a backup plate, and the one or more coil springs are positioned over the top or piston end of the rod. A press is then used to compress the one or more springs against the backup plate, with the upper seal plate being sandwiched between the spool and the backup plate. With the springs compressed, a snap ring may then be positioned on the piston rod for securing the compressed springs in place, and the piston may then be placed over the upper end of the piston rod. The piston rod, compressed spring and piston subassembly may then be positioned with the piston housing, and the piston housing then secured to the valve housing which includes a cage and a lower seal plate positioned therein. The above valve servicing operation takes a great deal of time. The press required to compress the spring is not available in some job sites, thereby further delaying the servicing of the SPM valves.

The disadvantages of the prior art are overcome by the present invention, and an improved two-position pilot-operated valve is hereinafter disclosed which significantly improves the life of the valve, which reduces the costs of replacing the cage, and which reduces the time and equipment required to service the valve. The valve of the present invention retains high reliability by utilizing the general design concept which has been proven in operation, although the frequency and the cost of servicing the valve is substantially reduced.

SUMMARY OF THE INVENTION

The two-position valve according to the present invention includes a generally cylindrical valve body, a cage within the valve body, and an axially movable spool for controlling fluid communication between the supply port and an outlet port in the valve body. The valve is commonly mounted on a subsea control pod, and is used to control fluid flow to a BOP ram. A coil spring normally maintains a piston in its up position axially away from the outlet port, so that supply pressure is blocked from the outlet port. The cage seals with both the valve body and the spool, and the top of the sleeve-shaped spool seals with an upper seal plate when the spool is in its closed position. Pilot pressure supplied to the valve moves a piston downward toward the outlet port, thereby compressing a coil spring and moving the spool downward toward the outlet port to disengage the upper seal plate and sealingly engage the lower seal plate, thereby establishing communication between the supply port and the outlet port and blocking communication between the outlet port and a vent port (if provided).

According to the present invention, the cage is fixed in the valve body between the upper seal plate and the lower seal plate. The cage is provided with an axially intermediate body which supports both the external seal for sealing engagement with the valve body and the internal seal for dynamic sealing engagement with the spool. The intermediate body is formed from a selected plastic material, and in a preferred embodiment is formed from PEEK with fiberglass reinforcing. An upper cage body is removably interconnected with the intermediate body, and includes a plurality of circumferentially spaced ports for transmitting fluid pressure between the supply port in the valve body and the spool. A lower cage body is similarly interconnected to the intermediate cage body, and also includes a plurality of ports in fluid communication with the vent port. The upper and lower cage bodies preferably are fabricated from metal, and may be removed from a worn intermediate body and placed on a new intermediate body during a cage servicing operation.

By providing an intermediate or center cage body formed from the plastic material, wear between the cage and the spool is significantly decreased, thereby increasing the number of times the SPM valve may be reliably cycled prior to servicing the valve. A T-seal is preferably provided for sealing engagement between the center cage body and the axially movable spool. The interior cylindrical surfaces of the center cage body above and below the T-seal which slidingly engage the exterior cylindrical surface of the spool do not damage the spool during cycling of the valve since they are formed from a plastic rather than metal material. By forming the center body of the cage from a plastic material, corrosion of the cage in the area of these seals is also significantly reduced. When the improved valve according to this invention is serviced, tests indicate that wear on the spool is significantly less than prior art valves, and accordingly the spool need not to be frequently replaced. Moreover, wear on the cage is reduced since the components of the cage which sliding engage the spool are fabricated from a plastic material. If the intermediate body of the cage needs to be replaced, the upper cage body and the lower cage body may be removed from the intermediate body, and the upper and lower cage bodies then threaded or otherwise secured to a new intermediate cage body, thereby significantly reducing the cost of the servicing the cage.

During a valve servicing operation, improved techniques are provided for securing the spool to the piston rod, and for comprising the coil springs which bias the spool to its closed position. The piston rod may be provided with a fixed stop for limiting upward travel of the coil springs. A nut may be threaded to an extended lower end of the piston rod, thereby compressing the springs against the backup plate. The nut may be torqued to a selected level then backed off one-eighth turn to provide a desired amount of play between the piston rod and the spool. The coil springs may thus be compressed without requiring the use of a press, thereby reducing the time and the equipment required to service the valve.

It is an object of the present invention to provide an improved two-position pilot-operated valve useful for controlling fluid flow to a ram of a blowout preventer, wherein the life of the valve is substantially extended by reducing wear between the cage and the spool.

It is a related object of this invention to reduce the cost of servicing a valve used for controlling fluid flow to a subsea BOP. The frequency of servicing the valve is reduced, the cost of replacing the cage is reduced, and the time and equipment required to service the valve are reduced.

It is a further object of the invention to provide a cage for use in a twoposition valve wherein the cage includes a intermediate body formed from a plastic material and carrying an external seal for sealing engagement with the valve body and an internal seal for dynamic sealing engagement with a spool. An upper cage body and a lower cage body are each removably secured to the intermediate body. If the intermediate body requires replacement, the upper and lower bodies may be removed and reattached to a new intermediate body, thereby reducing the cost of replacing the cage.

It is a feature of the present invention that the time and expense required to service an SPM valve is significantly reduced. According to the present invention, the nut which secures the spool to the piston rod is threaded on the rod to compress the coil springs, so that a press is not required to service the valve or replace a spool.

It is another feature of the invention that wear on the exterior cylindrical surface of the spool is significantly reduced. The interior cylindrical surfaces of the cage which may slidingly engage the spool are formed from a plastic material to reduce wear.

It is a further feature of the invention that the improved cage of this invention may be used on existing SPM valve bodies. A related feature is that the technique for securing a spool to the piston rod may be used for servicing existing SPM valves.

It is a significant advantage of the present invention that the SPM valve utilizes a overall design which has been proven high reliable in subsea petroleum recovery operations.

It is another advantage of this invention that the cost of manufacturing a SPM valve is not significantly increased, while the useful life of the valve is increased and service and maintenance costs are substantially reduced.

These and further objects, features and advantages of the present invention will become apparent from the following detailed description, wherein reference is made to the figures in the accompanying drawings.

5

Figure 1:
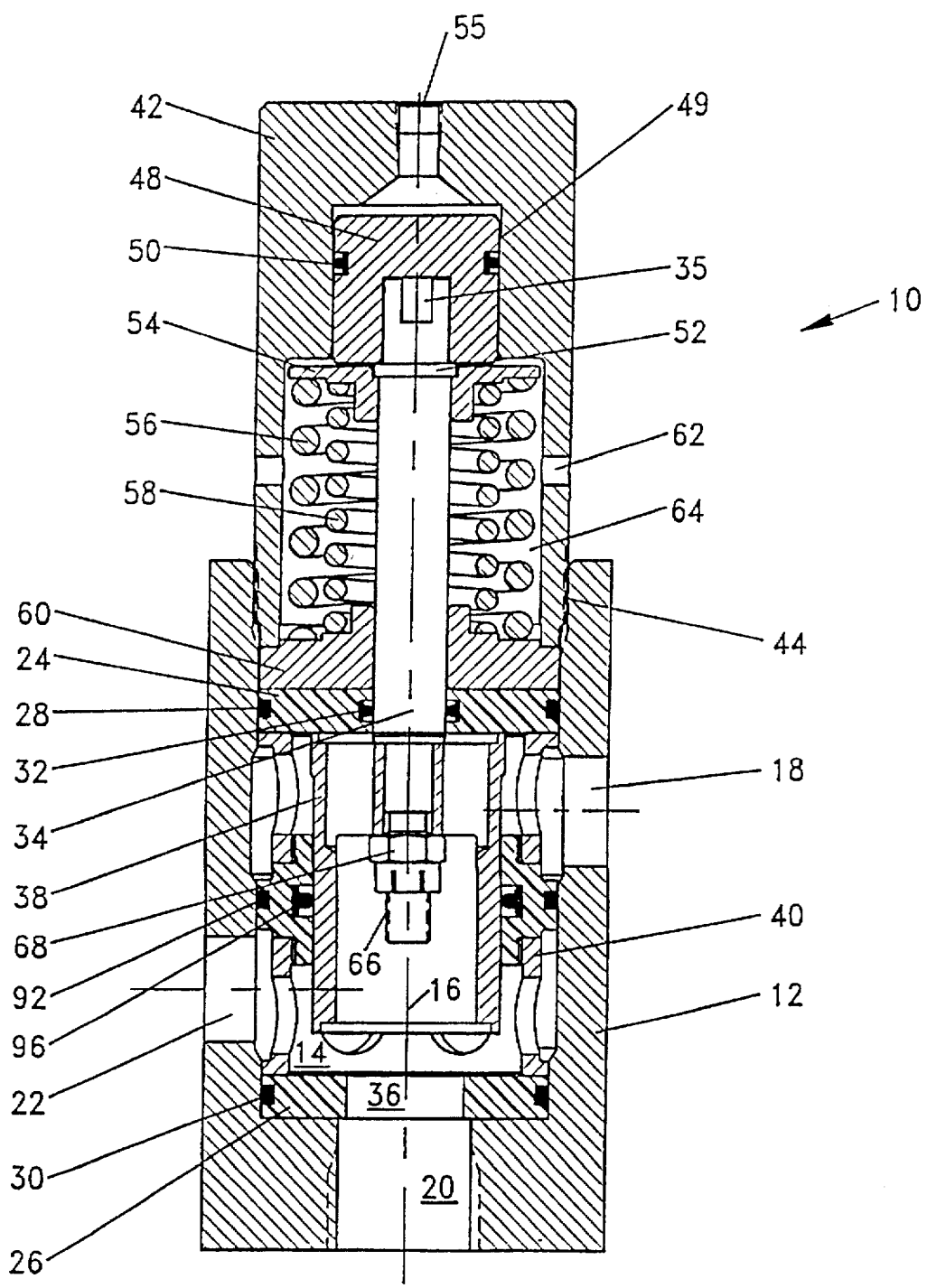
FIG. 1 is a cross-sectional view of a suitable SPM valve according to the present invention.
Figure 3:
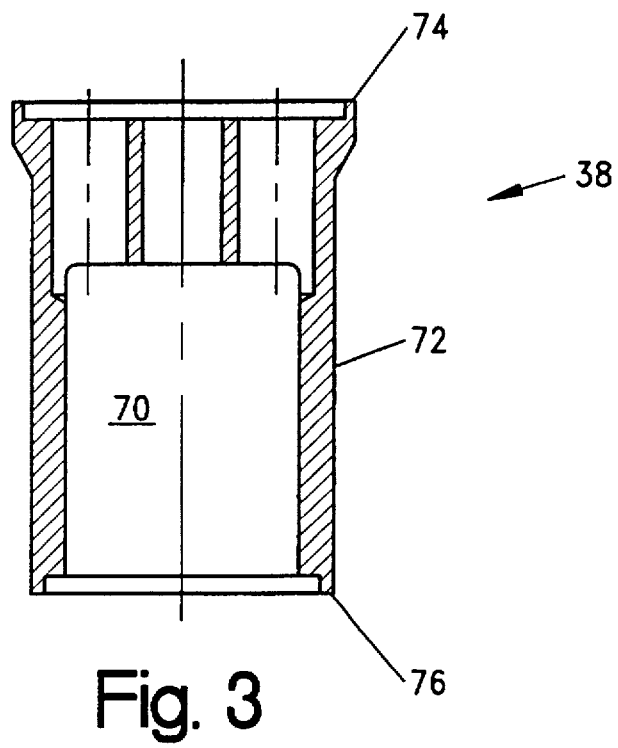

FIG. 3 is a detailed cross-sectional view of the spool generally shown in FIG. 1.

Figure 4:
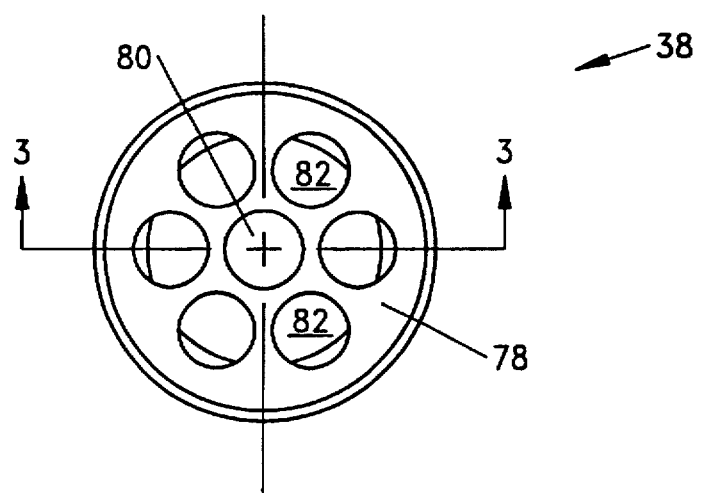

FIG. 4 is an end view of the spool shown in FIG. 3.

DETAILED DESCRIPTION OF THE PREFERRED EMBODIMENTS

FIG. 1 depicts a two-position pilot-operated SPM valve according to the present invention for controlling pressurized fluid flow to a ram of a subsea blowout preventer. Those skilled in the art will appreciate that the plurality of SPM valves are normally positioned on a subsea control pod above a BOP stack of a hydrocarbon recovery well. Pressurized fluid from a control unit at the surface is fed down to the SPM valves by a subsea hose bundle. The SPM valve is biased closed, and pilot pressure from the control pod is supplied to the SPM valve to open the valve and transmit pressurized flow from the hose bundle to the ram of a blowout preventer to open or close the ram. Due to the critical nature of the SPM valve, high reliability is required. The SPM valve is positioned in a subsea environment which is hostile and corrosive. Due to the high expense associated with retrieving and servicing the SPM valve. infrequent service is highly desired to reduce the overall costs of the hydraulic control system.

The two-position pilot-operated SPM valve 10 includes a generally cylindrical valve body 12 having a through passageway 14 formed about a central valve axis 16. A fluid inlet or supply port 18 is provided in a sidewall of the valve body, and is normally connected to a flow line which extends to the control unit at the surface. A discharge or outlet port 20 is provided in an end wall of the valve body, and transmits pressurized fluid to the ram of a blowout preventer when the valve 10 is open. A vent port 22 may optionally also be provided in a side of the valve body, and is typically exposed to the subsea environment.

The SPM valve 10 includes an upper seal plate 24 and a lower seal plate 26 each preferably formed from Delrin or another selected plastic material. O-ring 28 provides for static sealing engagement between seal plate 24 and the valve body 12, and a similar O-ring 30 provides static sealing between the seal plate 26 and the valve body 12. The upper seal plate 24 includes a internal T-seal 32 for dynamical sealing engagement with the piston rod 34. The lower seal plate 26 includes a central passageway 36 for fluid communication between the interior of the valve body 12 and the outlet port 20. A generally sleeve-shaped spool 38 is positioned on the lower end of the piston rod 34 for moving axially between the open and closed positions, as explained subsequently. Cage 40 is positioned within the passageway 14 in the valve body and spaced axially between the upper plate 24 and the lower plate 26, and is also discussed in further detail subsequently.

A piston housing 42 is threaded at 44 to the upper end of the valve body 12. The piston housing 42 includes a pilot port 55 for receiving pilot pressure from the control pod, as previously described. Piston 48 includes a seal 50 for sealing engagement with the interior cylindrical surface 49 of the housing 42, such that the piston 48 will move axially downward toward the discharge port 20 when pilot pressure is applied to the SPM valve. Piston rod 34 structurally interconnects the piston 48 and spool 38 to move the spool from the closed position shown in FIG. 1 wherein the spool is in sealing engagement with the upper seal plate 24 to an open position wherein the spool 38 is in sealing engagement with the lower plate 26.

The piston rod 34 includes an annular stop shoulder 52 for limiting upward movement of spring retainer 54. An outer

6 coil spring 57 and an inner coil spring 58 are each compressed between the plate 60 and the spring retainer 54, as shown in FIG. 1. Two coil springs 57 and 58 are preferred to obtain the desired biasing force at a reduced cost and to minimize the size of SPM valve, although one or more coil springs or other biasing members may be used. A plurality of vent ports 62 are provided in the piston housing 42 so that downward movement of the piston 48 does not increase pressure within the cavity 64 which contains the coil springs. Piston rod 34 thus passes through spring retainer 54 and the backup plate 60, and is in sealing engagement with the upper seal plate 24. The lower end of the piston shaft 34 includes an elongate threaded portion 66 for threaded engagement with lock nut 68 which retains the spool 38 on the piston rod 34.

Referring now to FIG. 3, the generally sleeve-shaped metal spool 38 includes flow passageway 70 therein and an elongate exterior cylindrical surface 72. An upper sealing surface 74 is provided for sealing engagement with the upper seal plate 24 when the spool is in its closed position. A lower sealing surface 76 is similarly provided for sealing engagement with the lower seal plate 26 when the spool is in the open position.

FIG. 4 illustrates an upper hub portion 78 of the spool 38, which includes a central port 80 therein for receiving the lower end of the piston shaft 34. A plurality of circumferentially spaced flow ports 82 are provided in the hub portion 78 for transmitting fluid the inlet port 18 through the cage 40 and then over the exposed top of the spool 38 and through from the passageway 70 in the spool to the discharge port 20 when the spool is moved out of sealing engagement with seal plate 24 in response to pilot pressure. Both the upper sealing surface 74 and the lower sealing surface 76 of the spool may be slightly tapered for more reliable sealing engagement with the upper seal plate 24 and the lower seal plate 26, respectively.

Figure 2:
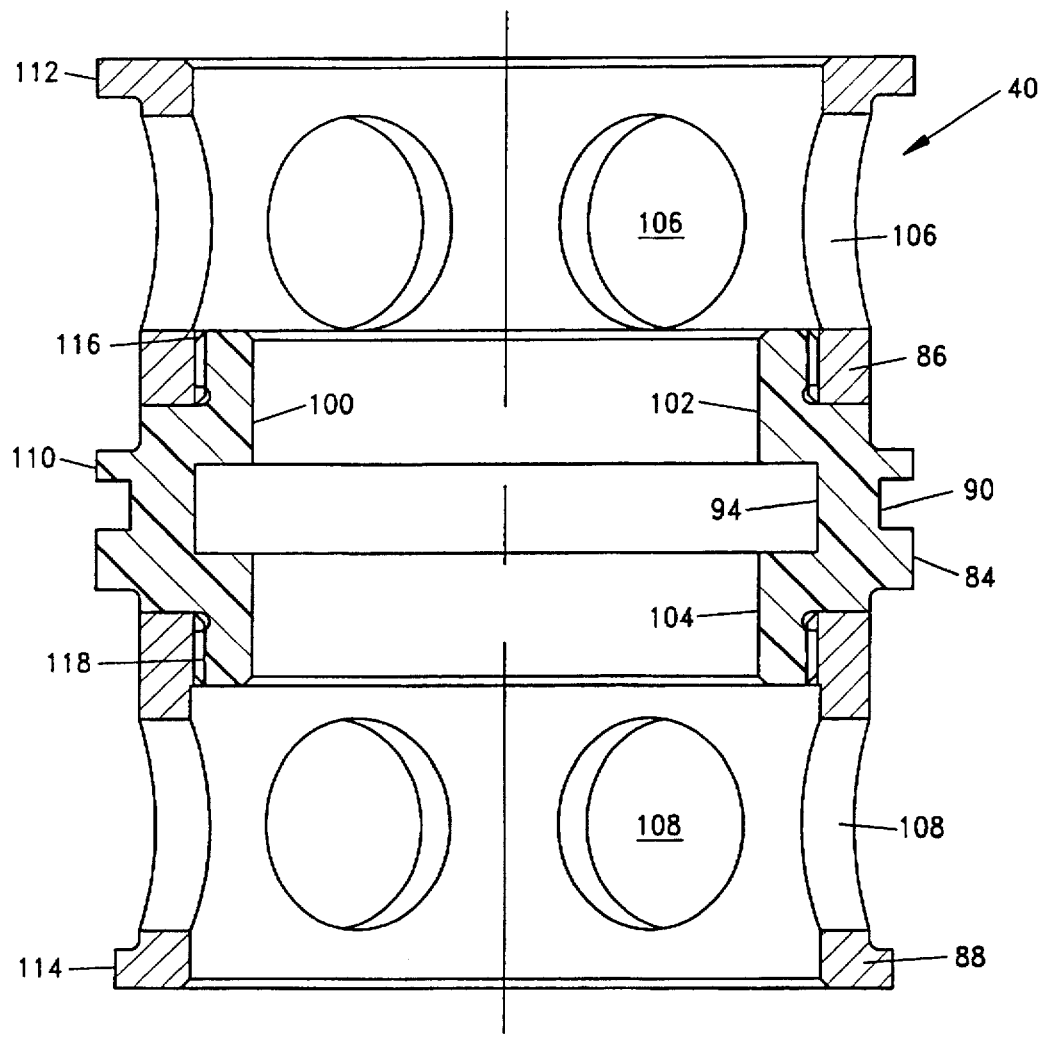
FIG. 2 is a detailed cross-sectional view of the improved valve cage generally shown in FIG. 1.

The cage 40 of the present invention as shown in greater detail in FIG. 2. The cage 40 comprises an axially intermediate body 84 which is formed from a selected plastic material, and an upper body 86 and a lower body 88 each removably secured to the intermediate body 84. Intermediate body 84 includes an external groove 90 receiving the O-ring seal 92 shown in FIG. 1 to provide static sealing engagement between cage 40 and the interior surface of the valve body 12. Intermediate body 84 also includes an interior annular groove 94 for receiving a T-seal 96 as shown in FIG. 1 for dynamic sealing engagement with cage 40 with the exterior cylindrical surface 72 of the spool, as shown in FIG. 3.

Interior cylindrical surface 100 of the intermediate body 84 includes an upper portion 102 and a lower portion 104 positioned above and below annular groove 94 and thus T-seal 96. Each of the cylindrical portions 102 and 104 has a diameter only slightly greater than the diameter of the exterior cylindrical surface 72 of the spool, and accordingly the surfaces 102 and 104 will likely be in sliding engagement with the exterior cylindrical surface 72 of the spool during reciprocation of the spool between the open and the closed positions.

The upper body 86 and the lower body 88 of the cage 40 are preferably similar, and each of these bodies is manufactured from metal to withstand the high forces of the pressurized fluid passing through the SPM valve and to reduce erosion of the throughports in these bodies. By forming the upper body 86 and lower body 88 from metal, a desired structural support is also provided to the plastic intermediate body 84 which carries the seals 92 and 96. The upper body includes a plurality of circumferentially spaced radial throughports 106, and the lower body 88 includes similar radial throughports 108. Throughports 106 provide fluid communication between the supply port 18 and the spool, while the lower ports 108 provide communication between the interior of the cage 40 and the vent port 22. The ports 108 are not necessary for the embodiment which does not include a vent port 22, but may be provided to reduce inventory. Less desirably, only the upper body 84 may be formed from metal, and the intermediate body and the lower body may be formed from a plastic material, particularly if the lower body does not include throughports and the axial length of the lower body formed from plastic is shortened. Optionally, the intermediate body and the lower body may be a unitary plastic component, particularly if a vent port is not provided in the SPM valve. It is important, however, that the upper body and lower body provide needed structural support for the plastic intermediate body, and accordingly both the upper body and the lower body are preferably fabricated from metals. Also, the upper body includes throughports (and the lower body preferably also includes throughports), and the size of the throughports for obtaining the desired flow with a minimum pressure drop and the configuration of the SPM valve is such that the portion of the cage with the radial throughports is fabricated from metal to obtain the desired strength for reliable and long term operation.

The outer cylindrical surface 110 of the intermediate body 84, the upper flange surface 112 of the upper body 86, and the lower flange surface 114 of the lower body 88 cooperate to secure the spool in place between the upper seal plate 24 and the lower seal plate 26. As shown in FIG. 2, the groove 90 is spaced axially nearer the top of the surface 110 than the bottom of surface 110, although in other embodiments both the groove 90 and the groove 94 are axially centered on the intermediate body 84.

Except as noted below, each of the components of the SPM valve as shown in FIG. 1 may be manufactured from a suitable metal material, such as stainless steel, which is corrosion resistant. The spool 38 may alternatively be manufactured from a titanium material, and both the spool and the piston rod 34 may include a titanium nitride hard facing or coating for extended life. The stainless steel lock nut 68 may be silver plated.

The intermediate body 84 of the cage and the upper and lower seal plates 24 and 26 are formed from the selected plastic materials, as described above. While any type of polyetheretherkeytone may be used for the intermediate body 84, a preferred material is the glass reinforced Arlon 1160 material available from Greene, Tweed and Company. In other applications, the intermediate body may be formed from a Delrin material. The selected plastic material for the intermediate body of the cage preferably has a high tensile strength at break (at least 15,000 psi and preferably greater than 10,000 psi), is relatively hard (at least 80 points Shore D hardness and preferably greater than 85 points), has a low coefficient of friction Oess than 0.34 and preferably less than 0.25), and has relatively low water absorption (less than 0.14% in 24 hours and preferably less than 0.10%). Also, a preferred plastic material has a tensile modulus greater than 600,000 psi and preferably greater than 1,000,000 psi, a flexible strength greater than 25,000 psi and preferably greater than 28,000 psi, and a flexural modulus greater than 600,000 psi and preferably greater than 1,000,000 psi. The O-ring and T-seals may be formed from any number of commonly available seal materials, depending on the application. Nitrile T-seals with nylon backups and Buna-N O-rings each available from Parker Seal Company may be used.

Each of the upper cage body 86 and lower cage body 88 may be removably secured to the intermediate body 84 by any desired means. According to a preferred embodiment, both the upper body 86 and the lower body 88 include threads 116 and 118, respectively, for being threadably secured to the intermediate body 84. In other embodiments, each of the upper body 86 and the lower body 88 may be press-fitted into reliable engagement with the intermediate body 84.

Wear tests were conducted on SPM valves utilizing a unitary stainless steel cage according to the prior art and using the improved cage of the present invention. The tests were conducted with contaminated water as the surrounding fluid. Fluid pressure at 3,000 psi was supplied to the supply port of each valve, and the outlet port of the SPM valve was fluidly connected to a BOP ram which was then activated during the test, thereby closely duplicating normal application conditions for an SPM valve. Each SPM valve was cycled 1000 times from the open position to the closed position and back to the open position. The prior art unitary metal cage showed severe signs of wear and galling on its interior cylindrical surface. The spool used in the prior art SPM valve also had considerable galling on its exterior cylindrical surface. The intermediate cage body of the cage according to this invention showed no significant galling or other damage. The interior cylindrical surface of the intermediate body merely exhibited a slight polishing. The exterior cylindrical surface of the spool used within the improved cage similarly showed no signs of significant damage and only very slight wear.

The wear tests described above clearly demonstrate the improvement of the SPM valve according to the present invention over the prior art. By fabricating the intermediate cage body from a selected plastic material and by removably securing the metal top and bottom cage bodies to the intermediate body, the useful life of a valve between required service operations is significantly enhanced. Sliding engagement of the plastic material interior surface of the cage with the metal exterior surface of the spool during valve cycling results in little wear. Also, the intermediate portion of the spool which carries the external seal for static engagement with the valve body and the internal seal for dynamic sealing engagement with the spool is formed from a corrosion-resistant material so that the SPM valve may be reliably used in subsea applications. The useful life of the valve is enhanced by forming the top and bottom portions of the cage from metal. These top and bottom cage portions may thus be removed from a cage with a worn intermediate plastic body and then reinstalled on a new intermediate cage body.

By forming the intermediate portion of the cage body from a plastic material as described above, wear between the cage and the spool is significantly reduced while the expense of the SPM valve remain substantially constant or is only slightly increased. This technique offers significant advantages over proposed techniques which include annular wear rings axially spaced from the cage-to-spool seal, and also offers significant advantages over alternative proposals which utilize expensive manufacturing operations to obtain very close part tolerances to significantly minimize or reduce sliding engagement between the interior cylindrical surface of the cage and the exterior cylindrical surface of the spool. In a less preferred embodiment, the intermediate portion of the spool may be fabricated from a relatively soft metal, such as bronze, thereby minimizing wear attributable to sliding engagement between the bronze intermediate cage body and the spool. In subsea applications, an intermediate body formed from bronze is not preferred since the intermediate body would be susceptible to corrosion.

According to the method of the present invention, an SPM valve which requires service may be retrieved to the surface and the piston housing 42 unthreaded from the valve body 12. The piston 48 may simply rest on top of the piston rod 34, and accordingly may be easily removed. The piston rod 34, the spring retainer plates 54 and 60, the upper seal plate 24, and the spool 38 may then be removed as a subassembly from the valve body. The cage 40 may then be removed from the exposed upper end of the valve body and may be checked. If desired, the interior cylindrical portion 84 of the cage may be replaced, and the upper and lower metal cage bodies 86 and 88 reinstalled on a new intermediate cage body. Prior to reinstalling the cage 40, the lower seal plate 26 may be removed, checked, and replaced, if necessary.

If the inspection reveals that the spool 38 needs to be replaced, the nut 68 may be unthreaded from the rod 34. The top seal plate 24, the spring plates 60 and 54, and the coil springs 56 and 58 may then be removed from the lower end of the rod 34, checked, and replaced if necessary. Each of these components are removed and may be reinstalled from the lower end of the rod 34, which is contrary to prior art SPM valves wherein these components were removed from and reinstalled over the upper or piston end of the rod. A new spool may then be placed on the lower end of the rod and the lock nut 68 tightened, thereby compressing the springs 56 and 58. During tightening of the nut 68, a flat 35 on the upper end of the rod may be engaged by a conventional tool to prevent rotation of the rod. Once fully tightened at a desired torque level, the lock nut 68 may be backed-off a selected amount, e.g., one-eighth turn, to provide the desired radial play between the rod 34 and the spool 38 (typically about 0.004 inch play). Since the piston 48 merely rests on top of the rod 34, limited radial play between the piston and the rod is also permitted. According to the present invention, tight tolerances between the various components is thus not required in order to obtain enhanced life for the SPM valve.

With the springs 56 and 58 compressed between the plates 54 and 60, the rod, the upper seal plate, and the spool may be inserted within the valve body with a cage with a new intermediate plastic body, the piston 48 positioned on top of the rod 34, and the piston housing 42 threaded into engagement with the valve housing 12. The SPM valve may then be replaced subsea on the control pod and will have an extended life compared to prior art SPM valves with a unitary metal cage.

Various changes in the SPM valve may be made without departing from the concepts of the present invention. By way of example, the spool 38 may have various configurations, although preferably it includes an upper surface for sealing engagement with a seal plate or equivalent structure when the spool is in the closed position, and a lower surface for sealing engagement with a lower seal plate or similar structure when the spool is in the open position. Also, different arrangements may be provided for the various ports of the valve, although preferably the outlet port is provided in an end plate of the valve body opposite the piston, and the inlet port is provided in a sidewall of the valve body. As previously noted, some embodiments include a vent port which is also provided in a sidewall of the valve body, although in other embodiments the SPM valve of the vent port is not required.

The foregoing disclosure and description of the invention is illustrative and explanatory thereof. It will be appreciated by those skilled in the art that various changes in the size, shape and materials, as well as in the details of the illustrated construction, combinations of features and the method steps discussed herein may be made without departing from this invention. Although the invention has thus been described in detail for several embodiments, it should be understood that this explanation is for illustration, and that the invention is not limited to these embodiments. Other modifications to the valve and the described method will thus be apparent to those skilled in the art in view of this disclosure. Such modifications may be made without departing from the invention, which is defined in the claims.

What is claimed is:

1. A two-position valve for controlling fluid flow to a ram of a subsea blowout preventer in response to pilot pressure, the valve comprising:
    a valve body having throughport formed about a central valve axis, a fluid inlet port, and a fluid outlet port;
    a piston axially movable with respect to the valve body in response to pilot pressure;
    a spool axially movable within the valve body in response to axial movement of the piston, the spool being axially movable between the open position such that the inlet port is in fluid communication with the outlet port and a closed position such that the inlet port is blocked by the spool from fluid communication with the outlet port;
    a piston rod for structurally interconnecting the spool and the piston;
    a cage within the valve body for receiving the spool, the cage including an axially intermediate body formed from a plastic material and including an exterior surface for mating engagement with an interior surface of the valve body, an upper body removably secured to the intermediate body and having at least one upper radial throughport therein, and a lower body removably secured to the intermediate body;
    an external seal for sealing between the intermediate body of the cage and the valve body; and
    an internal seal separate from the plastic material body for continuous dynamic sealing between the cage and the spool during axial movement of the spool between the open and closed positions.

2. The two-position valve as defined in claim 1, wherein each of the external seal and the internal seal is carried on the intermediate body of the cage.

3. The two-position valve as defined in claim 1, wherein the intermediate body of the cage includes a cylindrical interior surface for sliding engagement with an external cylindrical surface of the spool during axial movement of the spool between the open and closed positions.

4. The two-position valve as defined in claim 1, wherein the intermediate body of the cage is formed from a fiberglass reinforced PEEK material.

5. The two-position valve as defined in claim 1, further comprising:
    an annular upper seal plate spaced axially between the cage and the piston;
    a top sealing surface on the spool for sealing engagement with the upper seal plate when the spool is in the closed position;
    an annular lower seal plate spaced axially opposite the cage with respect to the piston; and
    a bottom sealing surface on the spool for sealing engagement with the lower seal plate when the spool is in the open position.

6. The two-position valve as defined in claim 1, further comprising:

a spring for biasing the spool toward the closed position.

7. The two-position valve as defined in claim 1, wherein the inlet port is provided in a side of the valve body and the outlet port is provided in an end of the valve body axially opposite the piston with respect to the spool.

8. The two-position valve as defined in claim 7, further including:

a vent port in a side of the valve body, the vent port being in fluid communication with the outlet port when the spool is in the closed position and the outlet port being blocked by the spool from fluid communication with the vent port when the spool is in the open position.

9. The two-position valve as defined in claim 1, wherein each of the upper body and lower body of the cage is formed from metal.

10. The two-position valve as defined in claim 1, wherein each of the upper body and lower body of the cage include a plurality of circumferentially spaced radial throughports therein.

11. A cage for positioning within a valve body of a two-position valve having a central valve axis, a fluid inlet port, and a fluid outlet port, a piston axially movable with respect to the valve body in response to pilot pressure, and a spool axially movable within the cage within the valve body in response to axial movement of the piston, the spool being axially movable between an open position such that the inlet port is in fluid communication with the outlet port and a closed position such that the inlet port is blocked by the spool from fluid communication with the outlet port, the cage comprising:

an axially intermediate body formed from a selected plastic material and having an exterior surface for mating engagement with at interior surface of the valve body;

an upper body removably secured to the intermediate body;

a lower body removably secured to the intermediate body;

the plastic material body having an upper portion axially overlapping a lower end of the upper body for radial alignment between the upper body and the intermediate body, and the plastic material body having a lower portion axially overlapping an upper end of the lower body for radial alignment between the lower body and the intermediate body;

an external seal carried on the intermediate body for sealing between the intermediate body of the cage and the valve body; and an internal seal carried on the intermediate body for sag between the cage and the spool.

12. The cage as defined in claim 11, wherein the intermediate body of the cage includes an internal cylindrical surface for sliding engagement with an external cylindrical surface of the spool during axial movement of the spool between the open and closed positions.

13. The cage as defined in claim 12, wherein the internal cylindrical surface of the intermediate body for sliding engagement with the spool includes an upper cylindrical surface portion spaced axially between the internal seal and the upper body, and a lower cylindrical surface portion spaced axially between the internal seal and the lower body.

14. The cage as defined in claim 11, wherein the intermediate body of the cage is formed from a fiberglass reinforced PEEK material.

15. The cage as defined in claim 11, wherein each of the upper body and lower body of the cage is formed from metal.

16. The cage as defined in claim 11, wherein each of the upper body and lower body of the cage include a plurality of circumferentially spaced radial throughports therein.

17. The cage as defined in claim 11, wherein each of the upper body and lower body of the cage are threadably connected to the intermediate body.

18. A method of servicing a two-position pilot-operated valve including a valve body having a central valve axis, a fluid inlet port, and a fluid outlet port, a piston axially movable with respect to the valve body in response to, pilot pressure, a spool axially movable within the valve body in response to axial movement of the piston, the spool being axially movable between an open position such that the inlet port is in fluid communication with the outlet port and a closed position such that the inlet port is blocked by the spool from fluid communication with the outlet port, a piston rod for structurally interconnecting the spool and the piston, a cage within the valve body for receiving the spool and including at least one radial upper throughport therein, an upper seal plate spaced axially between the cage and the piston for sealing engagement with the spool when in the closed position, a lower seal plate spaced axially between the cage and the fluid outlet port for sealing engagement with the spool when in the open position, and a spring to bias the spool toward the closed position, the method comprising:

replacing a worn cage with another cage including an axially intermediate cage body formed from a selected plastic material;

providing an external seal on the plastic material intermediate body for sealing between the intermediate body of the cage and the valve body and an internal on the plastic material intermediate body for continuous dynamic sealing between the cage and the spool during axial movement of the spool between the open and closed positions;

removably securing an upper cage body including the one or more radial upper throughports therein to the intermediate body;

removably securing a lower cage body to the intermediate body; and positioning the another cage including the intermediate cage body, the upper cage body, and the lower cage body within the valve body such that an exterior surface on the intermediate body is in mating engagement with an interior surface on the valve body and an internal cylindrical surface of the intermediate body is in sliding engagement with an external cylindrical surface of the spool during axial movement of the spool between the open and closed positions.

19. The method as defined in claim 18, further comprising:

forming each of the upper cage body and lower cage body from metal; and replacing a worn cage includes replacing a worn intermediate body with another intermediate body and securing each of the metal upper cage body and the metal lower cage body to the another intermediate body.

20. The method as defined in claim 18, further comprising:

forming a stop on the piston rod; and threading a nut to a lower end of the piston rod to attach the spool to the piston rod while simultaneously compressing the spring between the stop and the upper seal plate.

* * * * *

UNITED STATES PATENT AND TRADEMARK OFFICE
CERTIFICATE OF CORRECTION

PATENT NO. : 5,778,918
DATED : July 14, 1998
INVENTOR(S) : Mark V. McLelland

It is certified that error appears in the above-indentified patent and that said Letters Patent is hereby corrected as shown below:

In column 11 line 50, delete "sag" and insert --sealing--.

Signed and Sealed this

Twenty-second Day of September, 1998

Attest:

BRUCE LEHMAN

Attesting Officer          Commissioner of Patents and Trademarks

UNITED STATES PATENT AND TRADEMARK OFFICE
CERTIFICATE OF CORRECTION

PATENT NO. : 5,778,918
DATED : July 14, 1998
INVENTOR(S) : Mark W. McLelland

It is certified that error appears in the above-indentified patent and that said Letters Patent is hereby corrected as shown below:

In column 12, line 9, delete the comma between "to" and "pilot"--.

In column 12, line 31, after "internal" insert --seal--.

Signed and Sealed this

Seventeenth Day of November, 1998

Attest:

BRUCE LEHMAN

*Attesting Officer*  *Commissioner of Patents and Trademarks*